(12) United States Patent
Evans

(10) Patent No.: US 11,817,606 B2
(45) Date of Patent: Nov. 14, 2023

(54) METHODS AND SYSTEMS FOR REBALANCING ELECTROLYTES FOR A REDOX FLOW BATTERY SYSTEM

(71) Applicant: ESS TECH, INC., Wilsonville, OR (US)

(72) Inventor: Craig E. Evans, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 438 days.

(21) Appl. No.: 15/965,728

(22) Filed: Apr. 27, 2018

(65) Prior Publication Data
US 2018/0316033 A1   Nov. 1, 2018

Related U.S. Application Data

(60) Provisional application No. 62/491,966, filed on Apr. 28, 2017.

(51) Int. Cl.
| | | |
|---|---|---|
| *H01M 8/0662* | (2016.01) | |
| *H01M 8/18* | (2006.01) | |
| *H01M 8/04276* | (2016.01) | |
| *H01M 8/2455* | (2016.01) | |
| *H01M 8/04186* | (2016.01) | |

(52) U.S. Cl.
CPC ..... *H01M 8/0687* (2013.01); *H01M 8/04186* (2013.01); *H01M 8/04276* (2013.01); *H01M 8/188* (2013.01); *H01M 8/2455* (2013.01); *Y02E 60/50* (2013.01)

(58) Field of Classification Search
CPC .......... H01M 8/0687; H01M 8/04186; H01M 8/04276; H01M 8/2455; H01M 8/188; Y02E 60/528

USPC ........................................................ 429/218
See application file for complete search history.

(56) References Cited

U.S. PATENT DOCUMENTS

| | | | |
|---|---|---|---|
| 5,605,770 A | * | 2/1997 | Andreoli .......... H01M 8/04303 429/492 |
| 6,692,862 B1 | | 2/2004 | Zocchi |
| 7,800,345 B2 | | 9/2010 | Yun et al. |

(Continued)

FOREIGN PATENT DOCUMENTS

WO   2013027076 A1   2/2013

OTHER PUBLICATIONS

Zeng, Y. et al., "Performance enhancement of iron-chromium redox flow batteries by employing interdigitated flow fields," Journal of Power Sources, vol. 327, Sep. 30, 2016, 7 pages.

(Continued)

*Primary Examiner* — Christian Roldan
(74) *Attorney, Agent, or Firm* — McCoy Russell LLP

(57) ABSTRACT

A rebalancing reactor for a redox flow battery system may include a first side through which hydrogen gas is flowed, a second side through which electrolyte from the redox flow battery system is flowed, and a porous layer separating and fluidly coupled to the first side and the second side, wherein, the hydrogen gas and the electrolyte are fluidly contacted at a surface of the porous layer, and a pressure drop across the second side is less than a pressure drop across the porous layer. In this way, rebalancing of electrolyte charges in a redox flow battery system may be performed with increased efficiency and cost effectiveness as compared to conventional rebalancing reactors.

20 Claims, 8 Drawing Sheets

(56) References Cited

U.S. PATENT DOCUMENTS

| | | | |
|---|---|---|---|
| 9,509,011 B2 | 11/2016 | Evans et al. | |
| 2011/0086247 A1 | 4/2011 | Keshavarz et al. | |
| 2013/0045400 A1* | 2/2013 | Dong | H01M 8/188 |
| | | | 429/105 |
| 2013/0084482 A1 | 4/2013 | Chang et al. | |
| 2014/0131217 A1* | 5/2014 | Buschmann | C01B 15/00 |
| | | | 205/440 |
| 2014/0272483 A1 | 9/2014 | Pham et al. | |
| 2014/0363747 A1* | 12/2014 | Evans | H01M 8/0693 |
| | | | 429/409 |
| 2015/0093606 A1* | 4/2015 | Chen | H01M 10/48 |
| | | | 429/50 |
| 2015/0255824 A1 | 9/2015 | Evans et al. | |
| 2016/0006054 A1 | 1/2016 | Li et al. | |
| 2016/0093925 A1 | 3/2016 | Li et al. | |
| 2016/0248109 A1* | 8/2016 | Esswein | H01M 4/92 |
| 2016/0293992 A1 | 10/2016 | Song et al. | |
| 2016/0329589 A1* | 11/2016 | Cazenobe | H01M 8/04097 |
| 2017/0237104 A1* | 8/2017 | Kanno | H01M 8/0273 |
| | | | 429/105 |

OTHER PUBLICATIONS

Zeng, Y. et al., "A hydrogen-ferric iron rebalance cell operating at low hydrogen concentrations for capacity restoration of iron-chromium redox flow batteries," Journal of Power Sources, vol. 352, Jun. 1, 2017, 6 pages.

ISA Korean Intellectual Property Office, International Search Report Issued in Application No. PCT/US2018/030025, dated Aug. 29, 2018, WIPO, 2 pages.

Song, Y. et al., "Methods and System for a Battery," U.S. Appl. No. 15/965,673, filed Apr. 27, 2018, 66 pages.

Song, Y. et al., "Methods and Systems for Operating a Redox Flow Battery System," U.S. Appl. No. 15/965,709, filed Apr. 27, 2018, 44 pages.

Song, Y. et al., "Integrated Hydrogen Recycle System Using Pressurized Multichamber Tank," U.S. Appl. No. 15/965,627, filed Apr. 27, 2018, 50 pages.

Song, Y. et al., "Methods and Systems for Redox Flow Battery Electrolyte Hydration," U.S. Appl. No. 15/965,671, filed Apr. 27, 2018, 56 pages.

Song, Y. et al., "Flow Battery Cleansing Cycle to Maintain Electrolyte Health and System Performance," U.S. Appl. No. 15/965,722, filed Apr. 27, 2018, 56 pages.

ISA Korean Intellectual Property Office, International Search Report and Written Opinion Issued in Application No. PCT/US2018/030025, dated Aug. 29, 2018, WIPO, 10 pages.

European Patent Office, Extended European Search Report Issued in Application No. 18791771.1, dated Jan. 18, 2021, Germany, 9 pages.

* cited by examiner

FIG. 8
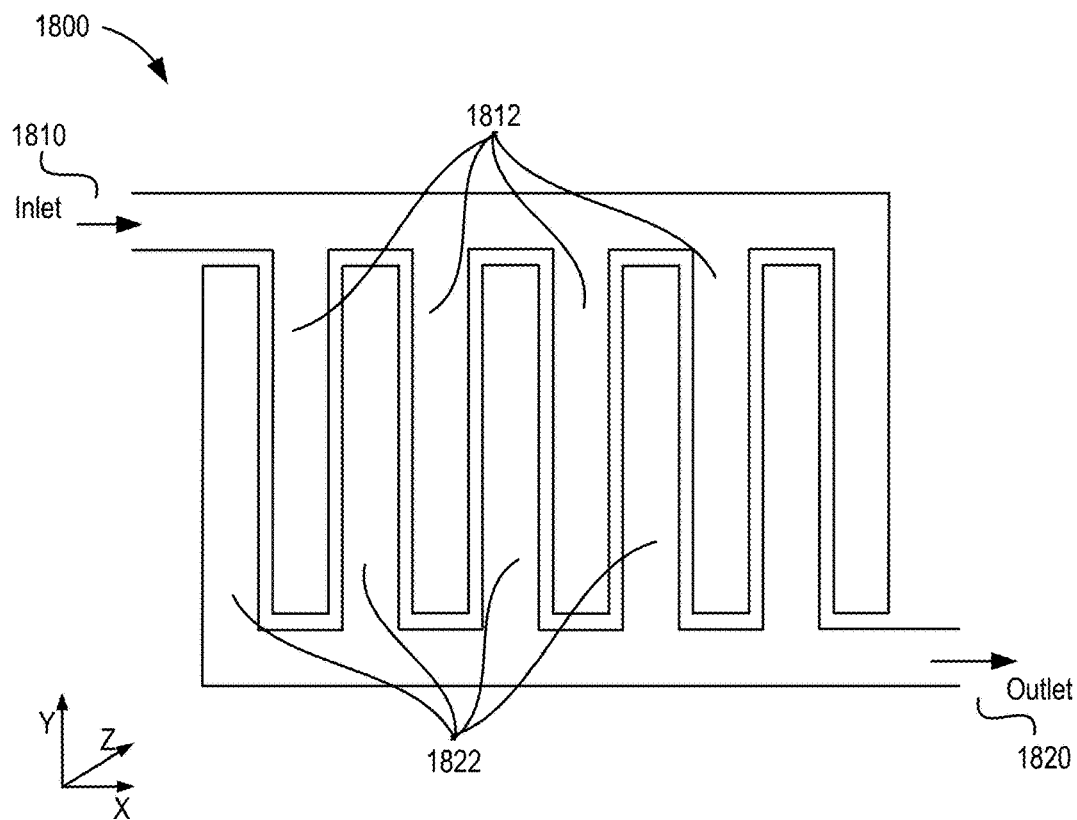
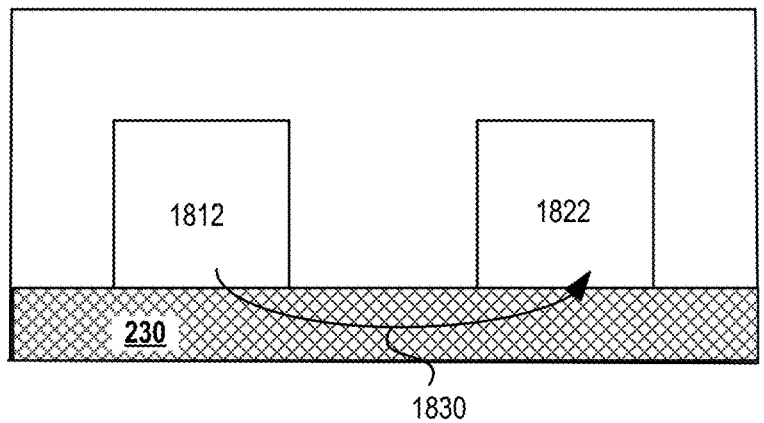

METHODS AND SYSTEMS FOR REBALANCING ELECTROLYTES FOR A REDOX FLOW BATTERY SYSTEM

CROSS REFERENCE TO RELATED APPLICATIONS

The present application claims priority to U.S. Provisional Application No. 62/491,966, entitled "Methods and System for a Rebalancing Electrolytes for a Redox Flow Battery System", and filed on Apr. 28, 2017. The entire contents of the above-listed application are hereby incorporated by reference for all purposes.

ACKNOWLEDGMENT OF GOVERNMENT SUPPORT

This invention was made with government support under contract No. DEAR0000261 awarded by the DOE, Office of ARPA-E. The government has certain rights in the invention.

FIELD

The present description relates generally to rebalancing reactors for flow battery systems.

BACKGROUND AND SUMMARY

Typical packed bed-type rebalancing reactors may exhibit less favorable reaction kinetics primarily because the rebalancing reactor system is in two-phase flow. As a result, mass transport losses in the packed bed-type rebalancing reactor systems can be higher, requiring significantly more catalyst to be utilized. Conventionally, a general approach to compensating for mass transport limitations has been to oversize the rebalancing reactors; however, oversizing the rebalancing reactors can be costly, and may further suffer from poor catalyst utilization.

One system that at least partially addresses the issues identified above, includes a rebalancing reactor for a redox flow battery system, including a first side through which hydrogen gas is flowed, a second side through which electrolyte from the redox flow battery system is flowed, and a porous layer separating and fluidly coupled to the first side and the second side. The hydrogen gas and the electrolyte are fluidly contacted at a surface of the porous layer. Furthermore, in one example, a pressure drop across the second side may be less than a pressure drop across the porous layer. In this way, rebalancing of electrolyte charges in a redox flow battery system may be performed with increased efficiency and cost effectiveness as compared to packed bed and other conventional designs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 illustrates an example plan view and cross-sectional view schematic of a positive or negative side interdigitated flow field (IDFF) configuration of the fuel cell rebalancing reactor of FIGS. 2 and 3.

DETAILED DESCRIPTION

Figure 1:
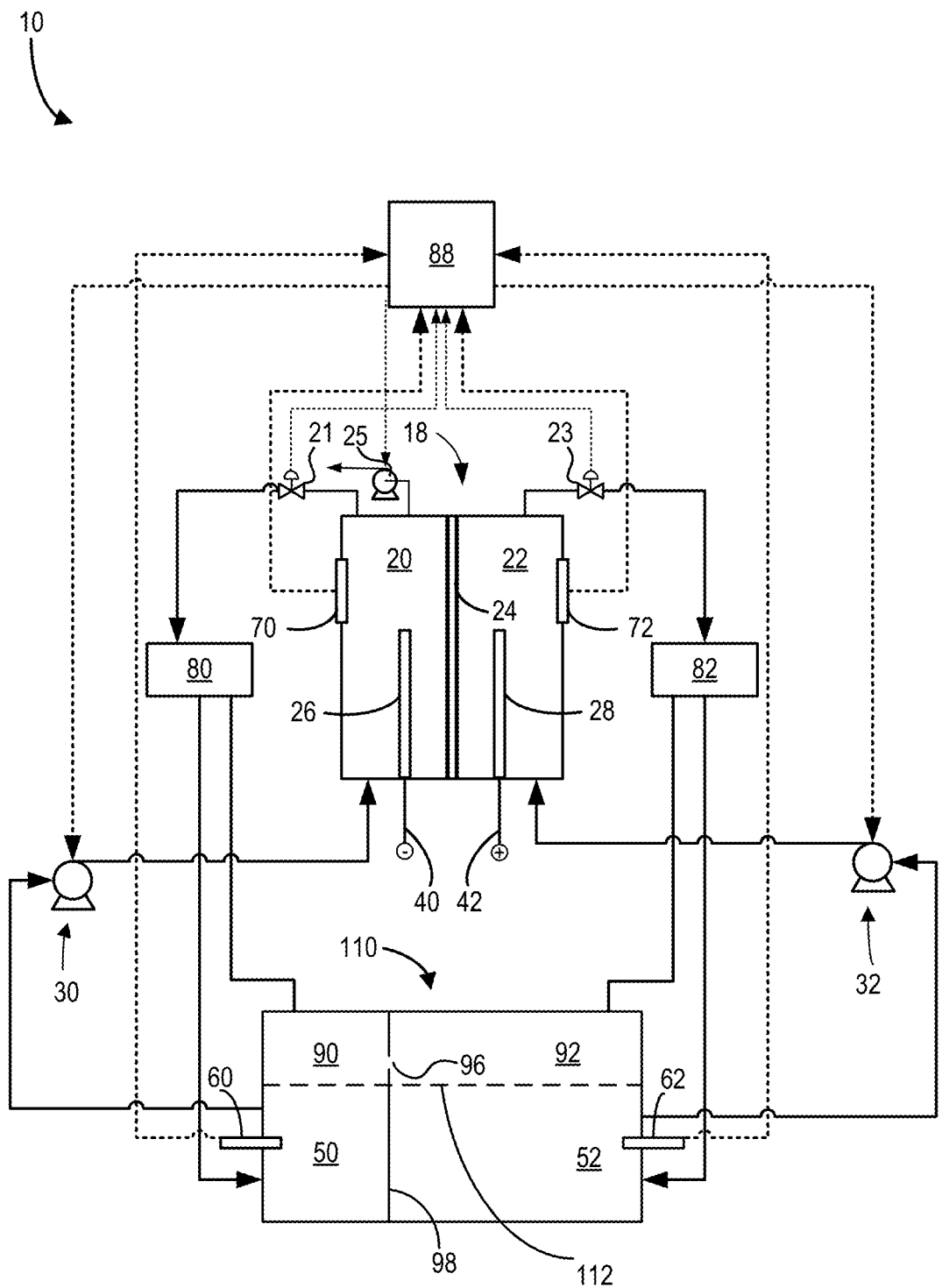
FIG. 1 shows an embodiment of a redox flow battery system.

Hybrid redox flow batteries are redox flow batteries that are characterized by the deposit of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

In a redox flow battery system the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Accordingly, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$: The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e- \leftrightarrow Fe^0 -0.44 \text{ V (Negative Electrode)} \quad (1)$$

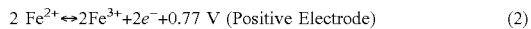

$$2\ Fe^{2+} \leftrightarrow 2Fe^{3+}+2e^- +0.77 \text{ V (Positive Electrode)} \quad (2)$$

As discussed above, the negative electrolyte used in the all iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and be dissolved back into the electrolyte. The equilibrium potential of the above reaction is $-0.44V$ and thus this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is $+0.77V$, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate causing it to plate onto the negative electrode.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external positive electrolyte tank or positive electrolyte chamber 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte tank 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of $Fe(OH)_3$. Precipitation of $Fe(OH)_3$ can damage the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

FIG. 1 provides a schematic illustration of a redox flow battery system 10. The redox flow battery system 10 may comprise a redox flow battery cell 18, fluidly connected to a multi-chambered electrolyte storage tank 110. The redox flow battery cell 18 may generally include a negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane. The negative electrode compartment 20 may comprise a negative electrode 26, and a negative electrolyte comprising electroactive materials. The positive electrode compartment 22 may comprise a positive electrode 28, and a positive electrolyte comprising electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise an integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. A such, the stored hydrogen gas can aid in purging other gases from the multi-chamber storage tank 100, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned at a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers in response to a liquid level decreasing below a solids fill threshold level. Said in another way, controller 88 may activate the one or more heaters in the negative and positive electrolyte chambers only in response to a liquid level increasing above the solids fill threshold level. In this way, activating the one or more heaters without sufficient liquid in the positive and/or negative electrolyte chambers can be averted, thereby reducing a risk of overheating or burning out the heaters. Other known types of tank heaters may be employed without departing from the scope of the present disclosure.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence a packed catalyst bed.

Side reactions occurring at the negative electrode may aid in generating electrolyte charge imbalances in the redox flow battery system. Concurrent to the redox reactions given by equation (1) at the negative electrode, the ferrous iron reduction reaction competes with the reduction of protons, H+, wherein two protons each accept a single electron to form hydrogen gas, $H_2$ and the corrosion of iron metal to produce ferrous ion, Fe2+. The production of hydrogen gas through reduction of hydrogen protons and the corrosion of iron metal are shown in equations (3) and (4), respectively:

$$H^+ + e^- \leftrightarrow \tfrac{1}{2}H_2 \text{ (proton reduction)} \quad (3)$$

$$Fe^0 + 2H^+ \leftrightarrow Fe^{2+} + H_2 \text{ (iron corrosion)} \quad (4)$$

As a result, the negative electrolyte in the negative electrode compartment 20 tends to stabilize at a pH range between 3 and 6, wherein formation of ferrous hydroxide ion (FeOH+), precipitation of ferric hydroxide, Fe(OH)3, and hydrogen evolution are all reduced. At the positive electrode compartment 22, ferric ion, Fe3+, has a much lower acid disassociation constant (pKa) than that of ferrous ion, Fe2+. Therefore, as more ferrous ions are oxidized to ferric ions, the positive electrolyte tends to stabilize at a pH less than 2, in particular at a pH closer to 1.

Accordingly, maintaining the positive electrolyte pH in a first range in which the positive electrolyte (positive electrode compartment 22) remains stable and maintaining the negative electrolyte pH in a second range in which the negative electrolyte (negative electrode compartment 20) remains stable may reduce low cycling performance and increase efficiency of redox flow batteries. For example, maintaining a pH of a negative electrolyte in an IFB between 3 and 4 may reduce iron corrosion reactions and increase iron plating efficiency, while maintaining a pH of a positive electrolyte less than 2, in particular less than 1, may promote the ferric/ferrous ion redox reaction and reduce ferric hydroxide formation.

As indicated by equation (3) and (4), evolution of hydrogen can cause electrolyte imbalance in a redox flow battery system. For example, during charge, electrons flowing from the positive electrode to the negative electrode (e.g., as a result of ferrous ion oxidation), may be consumed by hydrogen evolution via equation (3), thereby reducing the electrons available for plating given by equation (1). Because of the reduced plating, battery charge capacity is reduced. Additionally, corrosion of the iron metal further reduces battery capacity since a decreased amount of iron metal is available for battery discharge. Thus, an imbalanced electrolyte state of charge between the positive electrode compartment 22 and the negative electrode compartment 20 can develop as a result of hydrogen production via reaction (3) and (4). Furthermore, hydrogen gas production resulting from iron metal corrosion and proton reduction both consume protons, which can result in a pH increase of the negative electrolyte. As discussed above with reference to FIG. 1, an increase in pH may destabilize the electrolyte in the redox batter flow system, resulting in further battery capacity and efficiency losses.

An approach that addresses the electrolyte rebalancing issues that can be caused by hydrogen gas production in redox flow battery systems comprises reducing the imbalanced ion in the positive electrolyte with hydrogen generated from the side reactions. As an example, in an IFB system, the positive electrolyte comprising ferric ion may be reduced by the hydrogen gas according to equation (5):

$$Fe^{3+} + \tfrac{1}{2}H_2 \rightarrow Fe^{2+} + H^+ \quad (5)$$

In the IFB system example, by reacting ferric ion with hydrogen gas, the hydrogen gas can be converted back to protons, thereby maintain a substantially constant pH in the negative electrode compartment 20 and the positive electrode compartment 22. Furthermore, by converting ferric ion to ferrous ion, the state of charge of the positive electrolyte in the positive electrode compartment 22 may be rebalanced with the state of charge of the negative electrolyte in the negative electrode compartment 20. Although equation (5) is written for rebalancing electrolytes in an IFB system, the method of reducing an electrolyte with hydrogen gas may be generalized by equation (6):

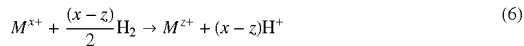

$$M^{x+} + \frac{(x-z)}{2}H_2 \rightarrow M^{z+} + (x-z)H^+ \quad (6)$$

In equation (6), $M^{x+}$ represents the positive electrolyte M having ionic charge, x, $M^{z+}$ represents the reduced electrolyte M having ionic charge, z.

A catalyst comprising graphite or comprising supported precious metal (e.g., carbon-supported Pt, Pd, Rh, Ru, Iridium, Tantalum or alloys thereof) catalyst may increase the rate of reaction described by equation (5) for practical utilization in a redox flow battery system. As an example, hydrogen gas generated in the redox flow battery system may be directed to a catalyst surface, and hydrogen gas and electrolyte (e.g., comprising ferric ion) may be fluidly contacted at the catalyst surface, wherein the hydrogen gas chemically reduces the ferric ion to ferrous ion and produces positive hydrogen ions (e.g., protons). As described above, the catalyst surface may comprise graphite. In some examples, the reaction described by equation (5) may proceed at a faster rate when the catalyst comprises a precious metal-based catalyst, such as carbon-supported Pt, Rh, Pd, Ru, Iridium, Tantalum or alloys thereof. As an example, in cases where the partial pressure of hydrogen gas (e.g. hydrogen gas concentration) is high and when a slower rate of reaction can be tolerated, the less costly graphite catalyst may be used. On the other hand, a small amount (e.g., 0.2 to >0.5 wt %) of precious metal catalyst supported on carbon can increase the rate of reaction as compared to using a graphite catalyst. Different types of catalysts, such as Pt, Pd, Rh, Ru, Iridium, Tantalum or alloys of the above, and the like, and different amounts (0.2 to >0.5 wt %) thereof can be utilized depending on a reaction speed for any specific battery system. Furthermore, alloys of the catalyst can be utilized to reduce cost and increase corrosion stability of the catalyst. For example 10% addition of rhodium to platinum can reduce the corrosion of platinum by the ferric ion by over 98% (Handbook of Corrosion Data, Bruce D. Craig, David S. Anderson).

During operation of a redox flow battery system, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. In one example, sensors 70 and 72 may include pressure sensors that transmit signals to the controller 88 indicating the pressure at the negative and positive sides of the separator 24 of the redox flow battery cell 18. The pressure at the negative and positive electrode compartments 20 and 22 of the separator 24 may be regulated by controlling the inlet and outlet flows of negative and positive electrolyte thereto, respectively. For example, the controller may decrease a pressure at the negative electrode compartment 20 by one or more of increasing a pump speed of a vacuum pump fluidly coupled to thereto, reducing a pump speed of the negative electrolyte pump 30, and by throttling a back pressure flow regulator to increase an outlet flow from the negative electrode compartment.

Similarly, the controller may increase a pressure at the positive electrode compartment 22 by one or more of increasing a pump speed of the positive electrolyte pump 32, and by throttling a back pressure flow regulator to decrease an outlet flow from the negative electrode compartment. Back pressure flow regulators may include orifices, valves, and the like. For example, controller 88 may send a signal to position a valve to a more open position, to induce higher outlet flows from negative electrode compartment 20, thereby reducing a negative electrode compartment pressure. Increasing the positive electrode compartment pressure and decreasing the pressure in the negative electrode compartment may aid in increasing a cross-over pressure (positive over negative) across the separator 24. Increasing the cross-over pressure by increasing the flow of the positive electrolyte by increasing the pump speed of the positive electrolyte pump 32 and increasing back pressure at the outlet of the positive electrode compartment 22 may be less desirable than other methods of increasing the cross-over pressure because pump parasitic losses may be increased.

Sensors may be positioned at other locations throughout the redox flow battery system to monitor electrolyte chemical properties and other properties. For example a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system 10. Sensor information may be transmitted to a controller 88 which may in turn actuate negative and positive electrolyte pumps 30 and 32 to control electrolyte flow through the cell 18, or to perform other control functions, as an example. In this manner, the controller 88 may be responsive to, one or a combination of sensors and probes. Redox flow battery cell 18 may be positioned within one of a plurality of redox flow battery cell stacks of a power module for a redox flow battery system. Each of the redox flow battery cells 18 in a redox flow battery cell stack may be electrically connected in series and/or parallel with a plurality of other redox flow battery cells in the redox flow battery cell stack. Furthermore each of the redox flow battery cell stacks may be electrically connected in series and/or parallel with a plurality of the other redox flow battery cell stacks in the power module. In this way, the redox flow battery cell stacks may be electrically combined to supply power from the power module.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110.

The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure. In response to the pH increase, controller 88 may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as Fe(OH)3.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system. For example the time period may be reduced if the recirculation rate is high, and local changes in concentration (e.g., due to side reactions or gas leaks) may quickly be measured since the time constants may be small.

Figure 2:
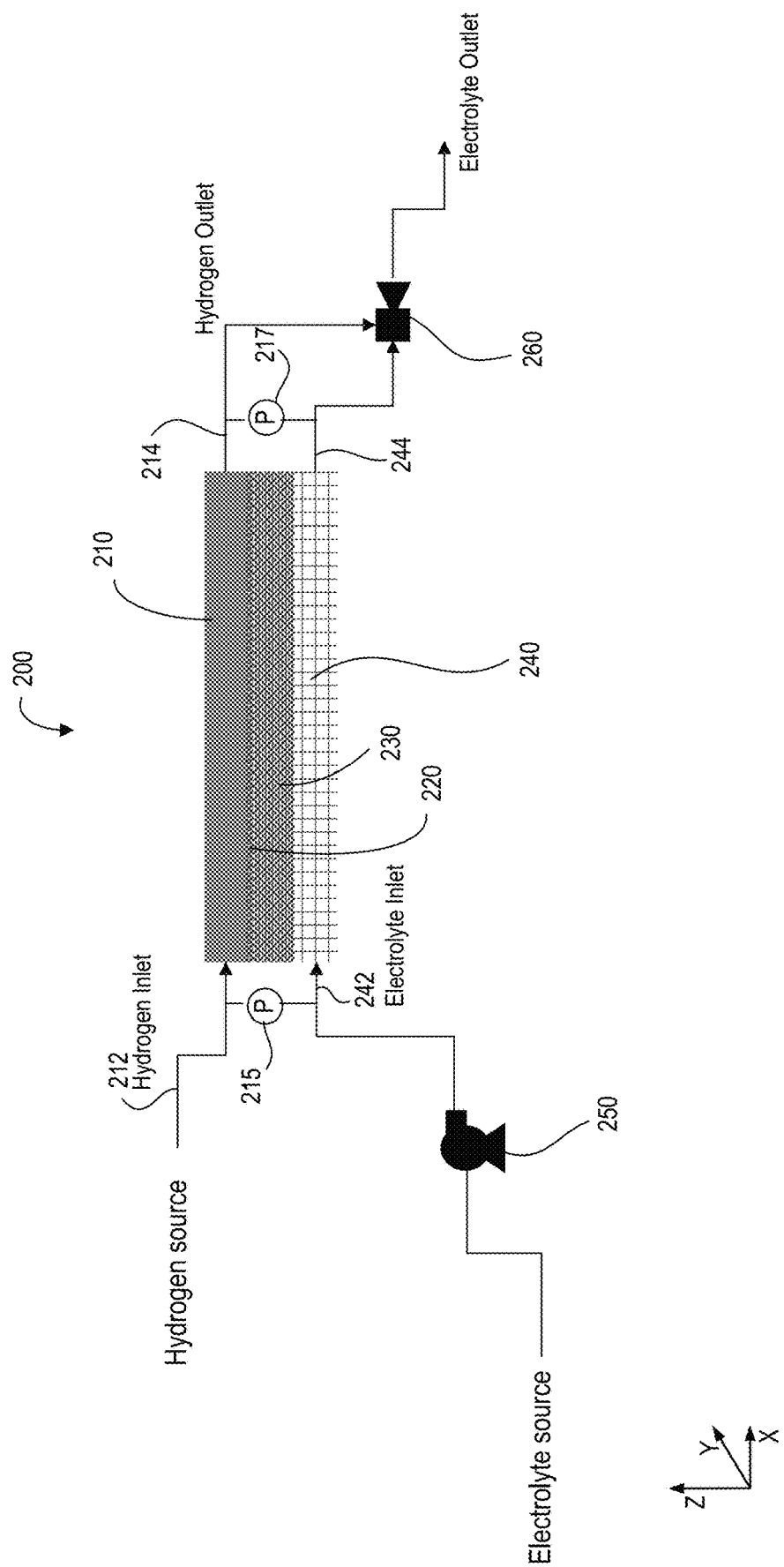
FIGS. 2-3 show a schematic for an example fuel cell rebalancing reactor.

Turning to FIG. 2, an example of a flow diagram for a fuel cell of a fuel cell rebalancing reactor 200 is provided. The fuel cell rebalancing reactor 200 is designed to contact hydrogen gas with electrolyte from the negative or positive electrode compartments of a redox flow battery at a catalyst surface. A catalyst comprising graphite and/or comprising a supported precious metal (e.g., carbon-supported Pt, Rh, Pd, Ru, or alloys thereof) catalyst may increase the rate of reaction described by equation (5) for practical utilization in a redox flow battery system. As an example, hydrogen gas generated in the redox flow battery system may be directed to a catalyst surface, and hydrogen gas and electrolyte (e.g., comprising ferric ion) may be fluidly contacted at the catalyst surface, wherein the hydrogen gas chemically reduces the ferric ion to ferrous ion and produces positive hydrogen ions (e.g., protons). As described above, the catalyst surface may comprise graphite. In some examples, the reaction described by equation (5) may proceed at a faster rate when the catalyst comprises a precious metal-based catalyst, such as carbon-supported Pt, Rh, Ru, Pd, or alloys thereof. In one example, the redox flow battery may include an IFB, but other types of flow battery chemistries may also be included without departing from the scope herein.

Fuel cell rebalancing reactor 200 may correspond to one or both of the rebalancing reactors 80 and 82 in the redox flow battery system of FIG. 1. The fuel cell rebalancing reactor 200 includes a negative side 210 and a positive side 240 and a porous layer 230 interposed and spatially separating the negative side 210 and the positive side 240. The negative side 210 may also be referred to as the hydrogen side and the positive side 240 may also be referred to as the electrolyte side. In one example, the porous layer 230 is ionically conductive so protons may be transported therethrough, and electrically conductive to drive the reaction by internal current. Hydrogen gas may be directed to the negative inlet 212 of the negative side 210 from the gas head space of an electrolyte storage tank, for example multi-chamber electrolyte storage tank 110, from a gas/liquid separator of a redox flow battery system, or from an external hydrogen source. Electrolyte may be directed to the positive inlet 242 at positive side 240 of the fuel cell rebalancing reactor from the negative or positive electrolyte chambers 50 and 52 of the multi-stage electrolyte storage tank 110 or from separate negative or positive electrolyte storage tanks, respectively. In one example, electrolyte pumps 250 may supply electrolyte from the negative or positive electrolyte chambers 50 and 52 to the positive side 240. In this way, electrolyte pump 250 may correspond to pump 30 or 32 of redox flow battery system 10.

Porous layer 230 may include a carbonaceous material such as graphite or carbon/graphite composite, and may include porous carbon structures such as carbon felt, a carbon sponge, and a carbon mesh. A surface of the pores of porous layer 230 may be hydrophilic to facilitate wetting of the porous layer 230 thoroughly with electrolyte to create an ionically conductive media. The hydrophilicity of the carbonaceous porous layer may be increased by coating or treating the surface thereof. In other words, porous layer may include a conductive, porous, hydrophilic, carbonaceous substrate. Furthermore, porous layer 230 may include a continuous one-piece material, without discrete particles or pieces, in order to reduce interphase mass-transport losses across boundary layer films of the porous layer 230 when contacting the hydrogen gas and the electrolyte liquid at the surface of the separator. For example, a packed bed including discretely packed catalyst particles may include mass-transport limiting boundary layer films surrounding each individual particle, thereby reducing a rate of mass-transport of hydrogen gas and liquid electrolyte from the bulk regions to the particle surface regions.

Fuel cell rebalancing reactor 200 may include one or more pressure transducers 215 and 217 positioned at the negative and positive inlets 212 and 242 and at the negative and positive outlets 214 and 244, respectively. In this way pressure drops between the negative inlet 212 and negative outlet 214, positive inlet 242 and positive outlet 244, as well as pressure drops across the porous layer at the inlet and outlet can be monitored by the controller 88. Pressure drops across the porous layer may be determined from pressure differences between the positive inlet 242 and the negative inlet 212, the positive outlet 244 and the negative outlet 214, and the positive outlet 244 and the negative inlet 212. Operation of fuel cell rebalancing reactor 200 may include maintaining the pressure drop between positive outlet 244 and positive inlet 242 less than the pressure drop across the porous layer (e.g., with the pressure at the negative side 210 greater than the pressure at the positive side 240), in order to reduce a risk of hydrogen gas crossing over from the negative side 210 to the positive side 240. Gas crossing over from the negative side 210 to the positive side 240 may hinder electrolyte liquid from entering the pores of the porous layer 230, thereby reduce the ionic conductivity of the porous layer 230. In one example, the pressure drop across the positive side 240 may be maintained less than the pressure drop across the porous layer 230 by more than a threshold pressure difference. Furthermore, the pressure drop across the negative side 210 may be maintained less than the pressure drop across the porous layer 230 by more than a threshold pressure difference. The threshold pressure difference may correspond to a pressure difference relative to the pressure drop across the porous layer 230 above which a risk of hydrogen gas crossing over from the negative side 210 to the positive side 240 may be reduced. Controller 88, may in response to a pressure drop across one or more of the positive side 240 and the negative side 210 being less than the pressure drop across the porous layer 230 by less than the threshold pressure difference, redirect electrolyte flow and hydrogen gas flow to another fuel cell rebalancing reactor and shut off hydrogen flow and/or electrolyte flow to the current fuel cell rebalancing reactor.

The fuel cell rebalancing reactor may further include a negative electrode 220 interposed between the negative side 210 and the porous layer 230, and a positive electrode interposed between the positive side 240 and the porous layer 230. In some examples, the porous layer 230 may serve as one or more of the negative electrode and the positive electrode. Applying a current across the electrodes may aid in driving the reduction of positive electrolyte at the catalytic surface of the rebalancing reactor 200. For example, the negative electrode may be coupled to the negative side of a voltage source so that electrons may be generated via the positive electrode (e.g., as hydrogen gas, $H_2$, is oxidized to hydrogen protons, $H^+$). The electrons provided to the negative electrode can reduce the $Fe^{3+}$ in the electrolyte to form $Fe^{2+}$ at the positive side to aid in rebalancing the electrolyte charge.

The negative and positive sides of the fuel cell rebalancing reactor may include structured channels or flow fields to direct and distribute the hydrogen gas and electrolyte throughout the interfacial area from the negative side 210 to the porous layer 230 and between the positive side 240 to the porous layer 230, respectively. For example, the flow fields may include an interdigitated flow field (IDFF), or non-interdigitated flow fields such as a serpentine flow field, a parallel flow field, a pin flow field, and the like. IDFF flow channels which terminate may facilitate forcing and pushing fluids into the porous layer 230, facilitating increased distribution of fluids from a negative side 210 or a positive side 240 of the rebalancing reactor 200 into the pores of the porous layer 230. In this way, the fuel cell rebalancing reactor 200 may facilitate contacting of the hydrogen gas from the negative side with the electrolyte liquid from the positive side.

An example of a structured flow field facilitated by an interdigitated flow field (IDFF) plate 1800 is shown in FIG. 8 with interdigitated ribs 1812 and 1822. Positioning the IDFF plate 1800 at the positive side 240 may aid in directing flow of electrolyte at the positive side through the porous layer 230, whereas positioning the IDFF plate 1800 at the negative side 210 may aid in directing flow of hydrogen gas at the negative side through the porous layer 230. In particular, electrolyte and/or hydrogen fluid flow may be directed from an inlet 1810 to an outlet 1820 of the positive flow field plate 2010. As shown in the cross-sectional view 1850 of the interdigitated positive flow field plate, fluid flow (indicated by the arrow 1830) from the interdigitated inlet channels of the interdigitated ribs 1812 to the outlet channels of the interdigitated ribs 1822 can occur by way of the porous layer 230, thus providing forced convection of the electrolyte. In other examples, the structured flow field plate may be a non-IDFF flow plate such as a serpentine flow plate, a spiral flow plate, a pin flow plate, or a parallel flow plate with non-interdigitated ribs. Owing to the dead-end channels, the IDFF flow field may be advantageous because electrolyte fluids may be distributed across the flow field more thoroughly, filling the interdigitated dead-end channels before diffusing through the porous layer 230 from the inlet channels to the outlet channels.

Figure 3:
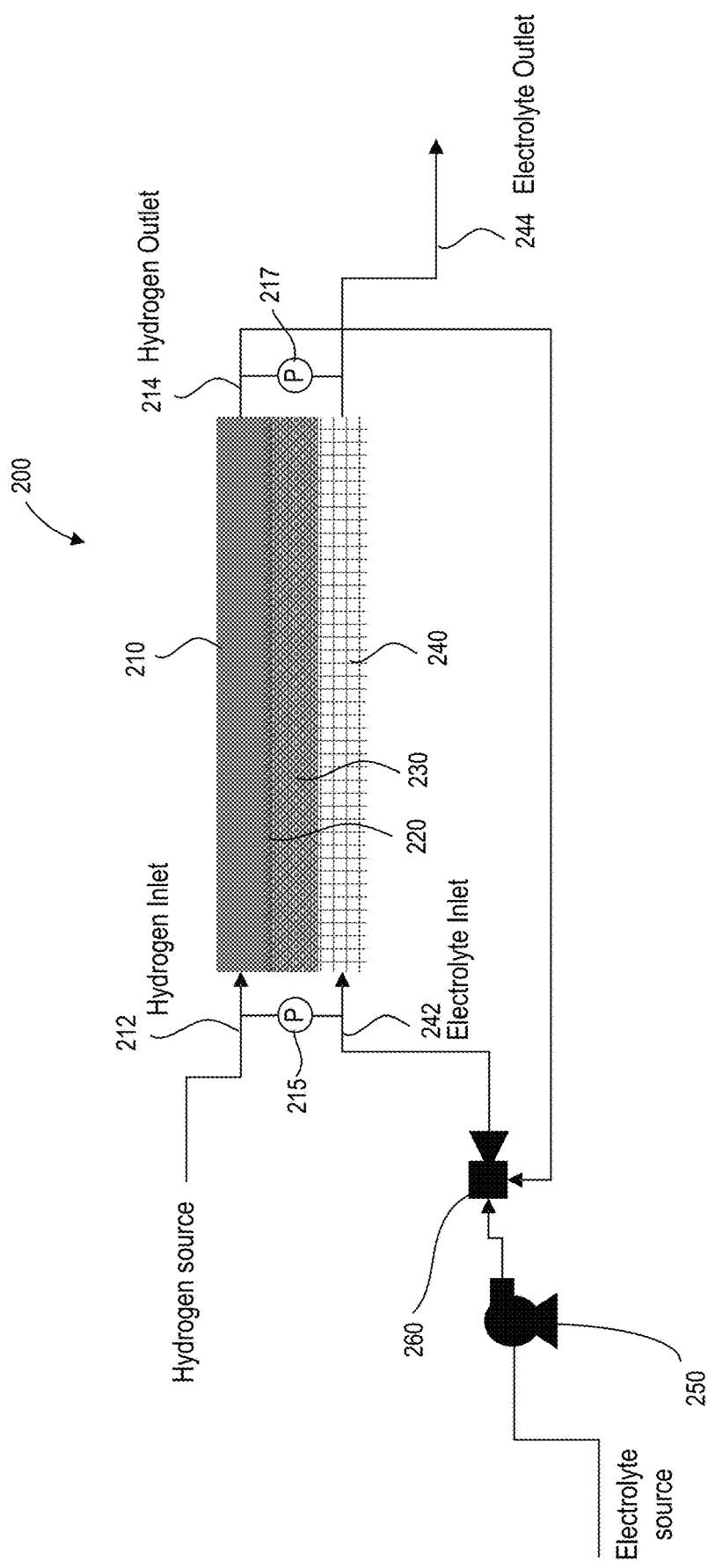

Fuel cell rebalancing reactors 200 may further include an ejector 260 positioned at an outlet side of the hydrogen side (FIG. 2) or an inlet side of the electrolyte side (FIG. 3) of the fuel cell rebalancing reactor 200. When ejector 260 is positioned at the outlet side of the hydrogen side of the fuel cell rebalancing reactor 200, outlet flow of electrolyte from the positive outlet 244 draws or aspirates hydrogen gas exiting the negative outlet 214, which becomes entrained therewith and is returned to the positive electrolyte chamber 52 or negative electrolyte chamber 50. Unused hydrogen is separated from liquid electrolyte in the multi-chamber electrolyte storage tank 110, and the separated hydrogen gas occupies the positive and negative gas head spaces 90 and 92, which are pressure-equilibrated via spill-over hole 96. In the case where ejector 260 is positioned at the inlet side of the electrolyte side of the fuel cell rebalancing reactor 200 (FIG. 3), inlet flow of electrolyte from the positive inlet 242 draws or aspirates hydrogen gas exiting the negative outlet 214, which becomes entrained therewith and flows through the fuel cell rebalancing reactor before being returned to the positive electrolyte chamber 52 or negative electrolyte chamber 50, and then separates. In this configuration, the ejector 260 may aid in dispersing hydrogen gas into the liquid electrolyte, thereby aiding the rebalancing reaction inside the fuel cell rebalancing reactor 200. The entrained gas may be separated from the liquid electrolyte upon returning to the positive electrolyte chamber 52 or negative electrolyte chamber 50, either spontaneously, as for the case of the multi-chamber electrolyte storage tank 110, or by way of additional gas/liquid separators fluidly coupled to the positive electrolyte chamber 52 and negative electrolyte chamber 50.

During their residence time within the fuel cell rebalancing reactor 200, the hydrogen gas can reduce metal ions within the liquid electrolyte at the surface of the porous layer 230, according to equation (6), wherein the carbonaceous porous layer 230 may serve as a catalyst (e.g., catalytic surface) therefor. In the case of an IFB, the hydrogen gas can reduce metal ions within the liquid electrolyte at the surface of the porous layer 230, according to equation (5). In order to increase an electrolyte rebalancing rate, a plurality of fuel cell rebalancing reactors may be stacked and fluidly connected in parallel so that a higher flow rate of hydrogen gas and electrolyte may be directed to the stack of fuel cell rebalancing reactors. In this way, controller 88, may in response to a pressure drop difference being less than the threshold pressure difference, redirect electrolyte flow and hydrogen gas flow to another fuel cell rebalancing reactor and shut off hydrogen flow and electrolyte flow to the current fuel cell rebalancing reactor, without disrupting the electrolyte rebalancing or the operation of the redox flow battery system.

Figure 4:
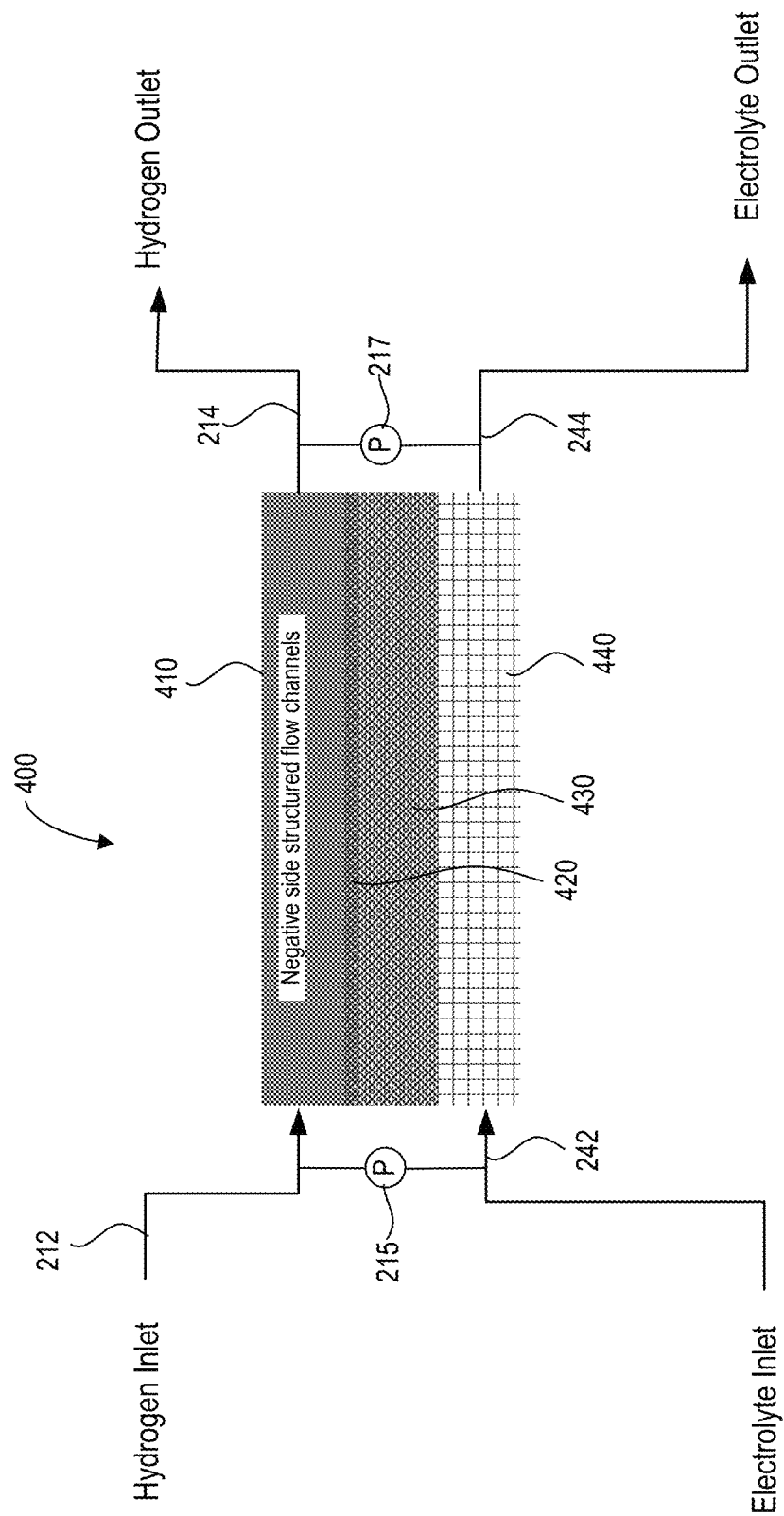
FIG. 4 shows a first embodiment of the fuel cell rebalancing reactor of FIGS. 2 and 3.

Turning now to FIG. 4, it illustrates a first embodiment 400 of fuel cell rebalancing reactor 200. The negative side 410 includes structured flow channels such as an IDFF or serpentine flow field, through which inlet hydrogen gas from positive inlet 242 are directed. The structured negative flow channels aid in forcing the hydrogen gas to evenly distribute and flow across an interfacial surface area shared between the negative side 410 and the negative electrode 420. In one example, the negative flow channels include plastic flow channels. Negative electrode may include a carbon, graphite, or carbon/graphite composite material including graphite paper and felt. In one example, the negative electrode may be integrated with the porous layer 430 (also of the same material and structure as the negative electrode). Negative electrode 420 may further include a surface layer of 5-50% Teflon® coated thereon and treated with a metal catalyst such as Pt, Pd, Rh, Ru, Iridium, Tantalum or alloys thereof. The positive electrode may be integrated with the positive side 440 and may include a carbon, graphite, or carbon/graphite composite such as carbon foam, carbon, or graphite felt. Porous layer 430 may include a carbon, graphite, and/or carbon/graphite composite such as graphite paper or felt, and may be surface treated to be hydrophilic. Although not shown in FIG. 4, similar to fuel cell rebalancing reactors 200, the first embodiment 400 of fuel cell rebalancing reactor 200 may further include an ejector 260 positioned at an outlet side of the hydrogen side (FIG. 2) or an inlet side of the electrolyte side (FIG. 3) of the fuel cell rebalancing reactor 200.

Figure 5:
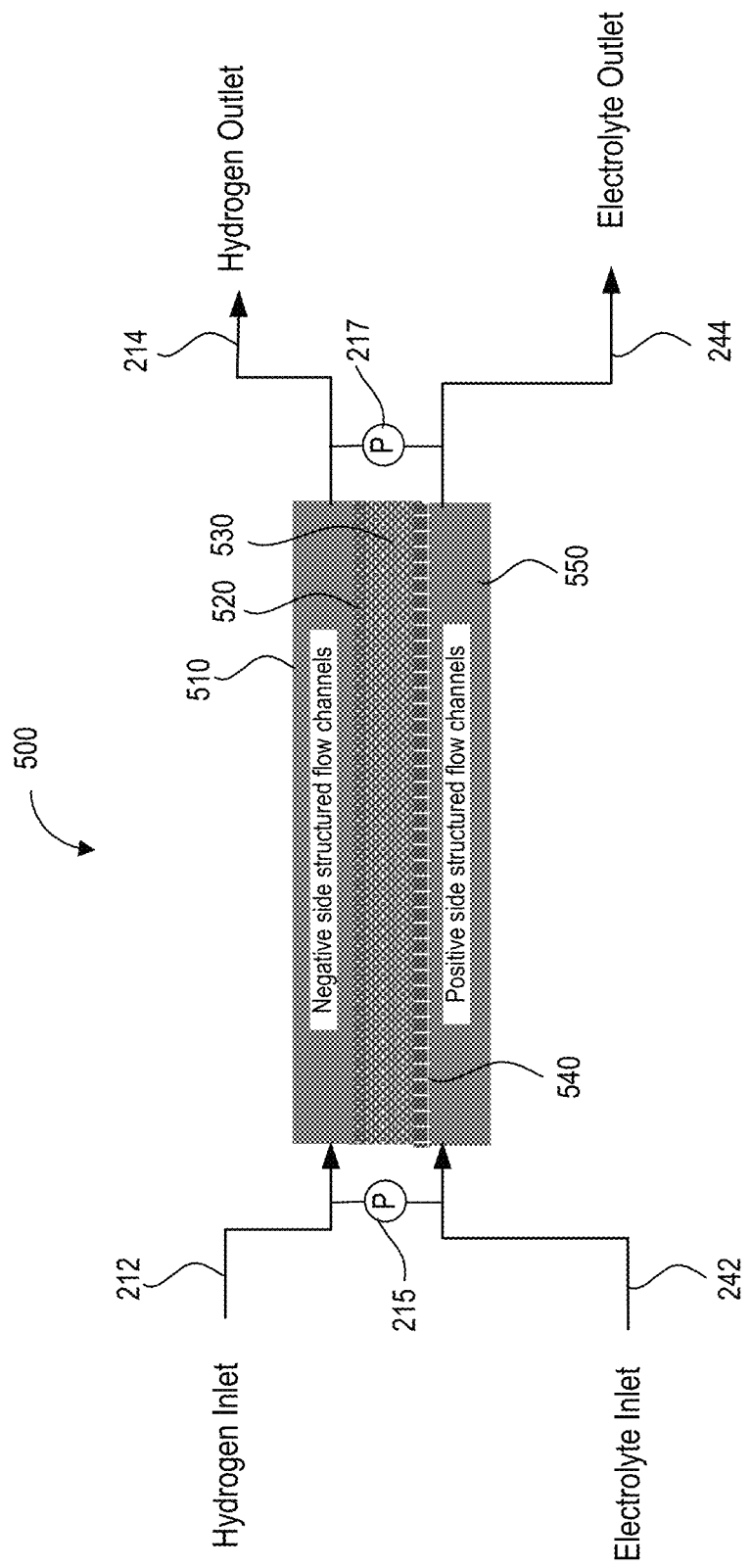
FIG. 5 shows a second embodiment of the fuel cell rebalancing reactor of FIGS. 2 and 3.

Turning now to FIG. 5, it illustrates a second embodiment 500 of fuel cell rebalancing reactor 200. Both the positive side 550 and the negative side 510 include structured flow channels such as an IDFF or serpentine flow field, through which inlet electrolyte from positive inlet 242 and hydrogen gas from negative inlet 212 are directed, respectively. The structured positive and negative flow channels aid in forcing the hydrogen gas to evenly distribute and flow across an interfacial surface area shared between the positive side 550 and the positive electrode 540, and between the negative side 510 and the negative electrode 520, respectively. In one example, the negative flow channels and the positive flow channels include plastic flow channels. Negative electrode 520 may include a carbon, graphite, or carbon/graphite composite material including graphite paper and felt. In one example, the negative electrode 520 may be integrated with the porous layer 530 (also of the same material and structure as the negative electrode). Negative electrode 520 may further include a surface layer of 5-50% Teflon® coated thereon and treated with a metal catalyst such as Pt, Pd, Rh, Ru, Iridium, Tantalum or alloys thereof. The positive electrode 540 may include a carbon, graphite, or carbon/graphite composite such as carbon foam, carbon, or graphite felt. Porous layer may include a carbon, graphite, and/or carbon/graphite composite such as graphite paper or felt, and may be surface treated to be hydrophilic. Although not shown in FIG. 5, similar to fuel cell rebalancing reactors 200, the fuel cell rebalancing reactor embodiment 500 may further include an ejector 260 positioned at an outlet side of the hydrogen side (FIG. 2) or an inlet side of the electrolyte side (FIG. 3) of the fuel cell rebalancing reactor 200.

Figure 6:
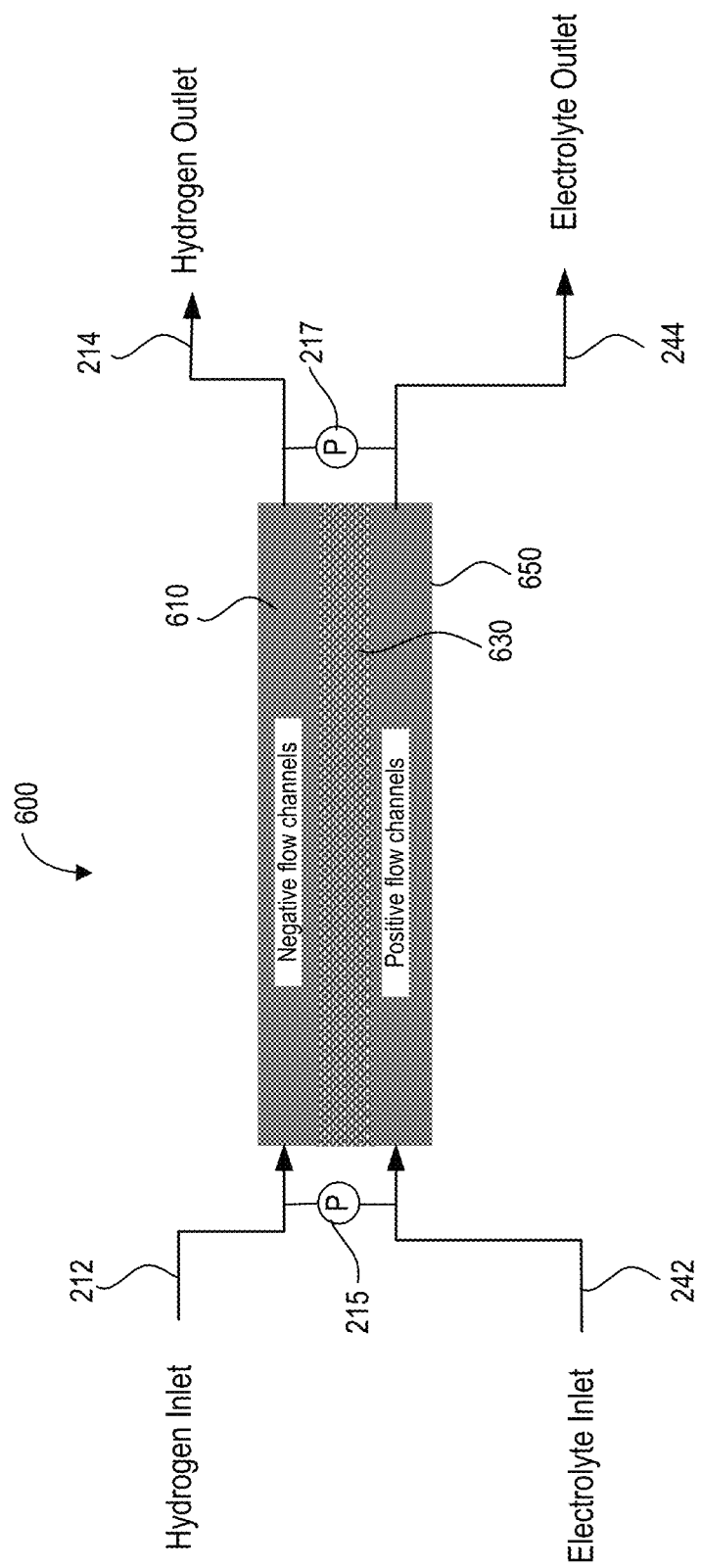
FIG. 6 shows a third embodiment of the fuel cell rebalancing reactor of FIGS. 2 and 3.

Turning now to FIG. 6, it illustrates a third embodiment 600 of fuel cell rebalancing reactor 200. Both the positive side 650 and the negative side 610 includes structured flow channels such as an IDFF or serpentine flow field, through which inlet electrolyte from positive inlet 242 and hydrogen gas from negative inlet 212 are directed, respectively. The structured positive and negative flow channels aid in forcing the hydrogen gas to evenly distribute and flow across an interfacial surface area shared between the positive side 550 and the porous layer 630, and between the negative side 610 and the porous layer 630, respectively. In one example, the negative flow channels and the positive flow channels include plastic flow channels. Negative and positive electrodes may be integrated with the porous layer 630 (also of the same material and structure as the negative electrode). In other words, porous layer 630 may include and may serve as both the negative and positive electrodes. Porous layer 630 may include a carbon, graphite, and/or carbon/graphite composite such as graphite paper or felt, and may be surface treated to be hydrophilic. In the third embodiment 600 of fuel cell rebalancing reactor 200, the fuel cell rebalancing reactor carries out the rebalancing reactions in the absence of a metal catalyst. Although not shown in FIG. 6, similar to fuel cell rebalancing reactors 200, the third embodiment 600 of fuel cell rebalancing reactor 200 may further include an ejector 260 positioned at an outlet side of the hydrogen side (FIG. 2) or an inlet side of the electrolyte side (FIG. 3) of the fuel cell rebalancing reactor 200.

Thus, a rebalancing reactor for a redox flow battery system may include a first side through which hydrogen gas is flowed, a second side through which electrolyte from the redox flow battery system is flowed, and a porous layer separating and fluidly coupled to the first side and the second side, wherein, the hydrogen gas and the electrolyte are fluidly contacted at a surface of the porous layer, and a pressure drop across the second side is less than a pressure drop across the porous layer. In a first example of the rebalancing reactor, the pressure drop across the second side corresponds to a pressure drop across an inlet and an outlet of the second side. A second example of the rebalancing reactor optionally includes the first example, and further includes wherein a pressure drop across the first side is greater than the pressure drop across the second side. A third example of the rebalancing reactor optionally includes one or more of the first and second examples, and further includes an ejector, wherein the electrolyte exiting the second side flows through the ejector thereby drawing the hydrogen gas exiting the first side through the ejector. A fourth example of the rebalancing reactor optionally includes one or more of the first through third examples, and further includes an ejector, wherein the electrolyte entering the second side flows through the ejector thereby drawing the hydrogen gas exiting the first side through the ejector. A fifth example of the rebalancing reactor optionally includes one or more of the first through fourth examples, and further includes wherein the first side includes an interdigitated flow field through which the hydrogen gas is flowed, thereby forcing the hydrogen gas entering the first side through the porous layer prior to exiting the first side. A sixth example of the rebalancing reactor optionally includes one or more of the first through fifth examples, and further includes wherein the second side includes an interdigitated flow field through which the electrolyte is flowed, thereby forcing the electrolyte entering the second side through the porous layer prior to exiting the first side. A seventh example of the rebalancing reactor optionally includes one or more of the first through sixth examples, and further includes a negative electrode and a positive electrode conductively coupled to the porous layer, wherein electric current applied across the negative electrode and the positive electrode increases a rebalancing reaction rate between the hydrogen gas and the electrolyte.

Thus, a redox flow battery system includes a plurality of redox flow battery cells, and first rebalancing reactor fluidly coupled to a second rebalancing reactor, each of the first and second rebalancing reactors including, a first side through which hydrogen gas is flowed, a second side through which electrolyte from the plurality of redox flow battery cells is flowed, and a porous layer separating and fluidly coupled to the first side and the second side, wherein, the hydrogen gas and the electrolyte are fluidly contacted at a surface of the porous layer, and a pressure drop across the second side is less than a pressure drop across the porous layer by less than threshold pressure difference. A first example of the redox flow battery system includes a controller, with executable instructions stored in memory thereon to, responsive to the pressure drop across the second side of the first rebalancing reactor being less than the pressure drop across the porous layer by less than the threshold pressure difference, redirect a portion of the flow of the electrolyte from the first rebalancing reactor to the second rebalancing reactor. A second example of the redox flow battery system optionally includes the first example, and further includes wherein the executable instructions include, responsive to the pressure drop across the second side of the first rebalancing reactor being less than the pressure drop across the porous layer by less than the threshold pressure difference, reducing a flow of the electrolyte to the second side of the first rebalancing reactor.

Figure 7:
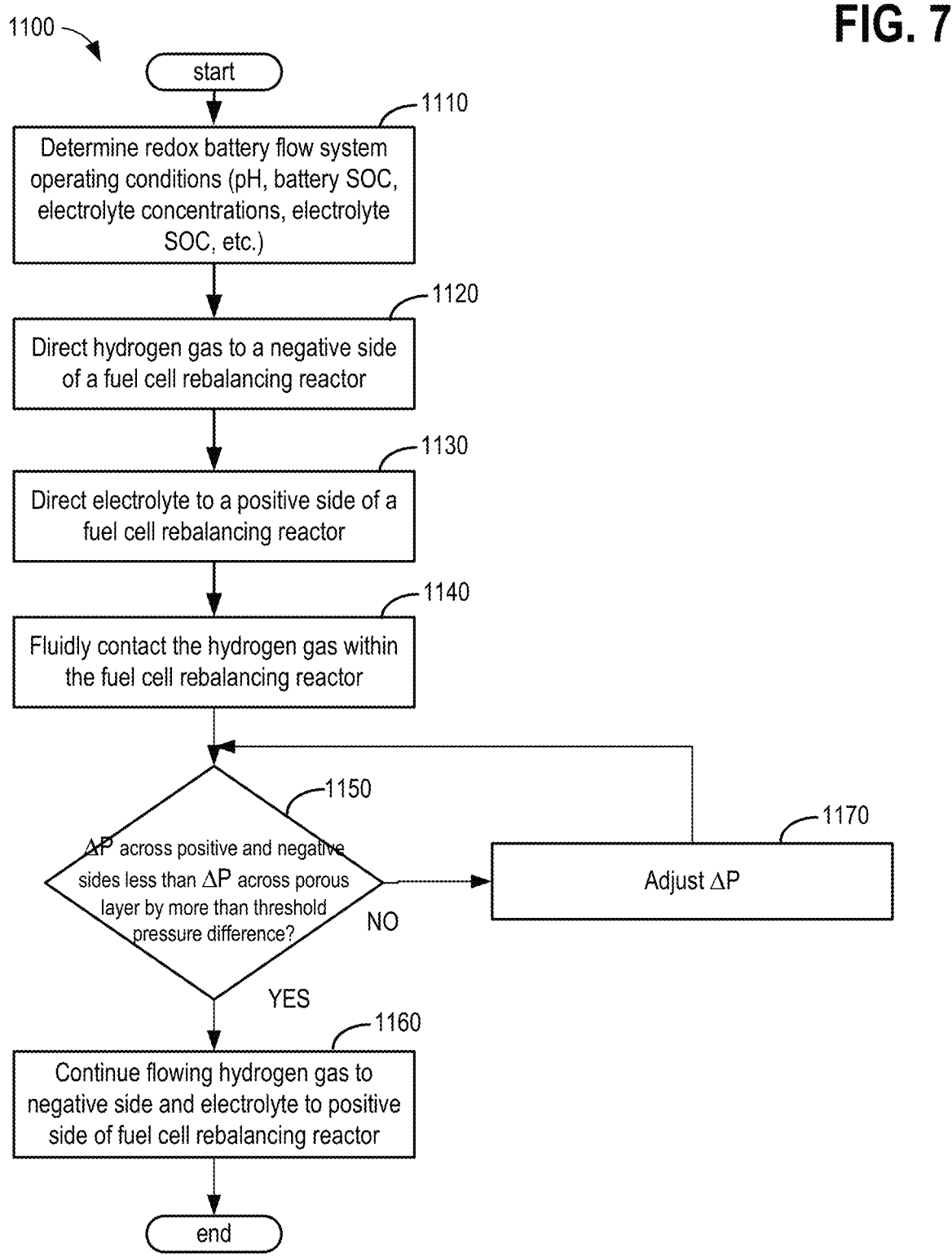
FIG. 7 illustrates an example flow chart for method of rebalancing electrolytes in the redox flow battery system of FIG. 1 by way of the fuel cell rebalancing reactor of FIGS. 2 and 3.

Turning now to FIG. 7, it illustrates a flow chart for an example method 1100 of rebalancing electrolytes in a redox flow battery system 10 with one or more fuel cell rebalancing reactors 200. The fuel cell rebalancing reactors 200 may include the components described with reference to FIGS. 2-3 as well as the embodiments thereof as described with reference to FIGS. 4-6. Method 1100 may be performed as executable instructions residing in a non-transitory memory on board a controller 88. Method 1100 begins at 1110 where the controller 88 determines redox flow battery system operating conditions such as pH, fuel cell rebalancing inlet and outlet pressures, hydrogen gas and electrolyte flows to the fuel cell rebalancing reactor, and the like. At 1120, method 1100 directs hydrogen gas to a negative side of the fuel cell rebalancing reactor. The hydrogen gas may be supplied from a gas head space within a negative electrolyte chamber of an electrolyte storage tank or an external hydrogen source. At 1130, liquid electrolyte is directed to a positive side of the fuel cell rebalancing reactor. The liquid electrolyte may include positive electrolyte from a positive electrolyte chamber 52 or negative electrolyte from a negative electrolyte chamber 50. Accordingly, the liquid electrolyte may be supplied to the fuel rebalancing reactor by negative and positive electrolyte pumps 30 or 32 or by separate pumps for these reactors only. At steps 1120 and 1130, hydrogen gas and liquid electrolyte may be directed to a plurality of fuel cell rebalancing reactors fluidly connected in parallel to enable higher charge rebalancing flow rate capacities.

Next, at step 1140, the hydrogen gas and the liquid electrolyte may be fluidly contacted within the fuel cell rebalancing reactor. Fluidly contacting the hydrogen gas and the liquid electrolyte may include directing the hydrogen gas and/or liquid electrolyte through structured flow channels (e.g., interdigitated or non-interdigitated) to distribute the hydrogen gas and/or liquid electrolyte evenly across an interfacial area of the porous layer and the positive and negative electrodes. Fluidly contacting the hydrogen gas and the liquid electrolyte may further include directing the hydrogen gas and the liquid electrolyte into the pores of the continuous porous layer 230. The continuous nature of the porous layer 230 may aid in reducing interphase mass-transport losses across boundary layer films of the porous layer 230 when contacting the hydrogen gas and the electrolyte liquid at the surface of the separator.

Next, at 1150, the controller may determine if a pressure drop ($\Delta P$) across a positive side and a negative side of the fuel cell rebalancing reactor is less than a pressure drop across the porous layer by more than a threshold pressure difference. Furthermore, the pressure drop across the negative side may be maintained greater than a pressure drop across the positive side. In one example, the threshold pressure difference is based on a bubble pressure across the porous layer 230 of the fuel cell rebalancing reactor. The bubble pressure of the porous layer 230 may be determined ex-situ, and may correspond to a pressure above which a bubble may be forced through the porous layer 230. Additionally or alternatively, the threshold pressure difference is based on a pressure drop across the porous layer 230, and can be determined from one or a combination (e.g., an average or weighted average) of the pressure differences between the positive inlet 242 and the negative inlet 212, the positive outlet 244 and the negative outlet 214, and the positive outlet 244 and the negative inlet 212. In one example, the pressure drop across the positive side 240 and negative side 210 may be maintained less than the bubble pressure of porous layer 230. The threshold pressure difference may correspond to a pressure difference above which a risk of hydrogen gas crossing over from the negative side 210 to the porous layer 230 may be reduced or a risk of hydrogen displaces liquid from the porous layer 230 resulting in higher ionic resistance. For the case where the pressure drop ($\Delta P$) across the positive side of the fuel cell is less than the $\Delta P$ across the porous layer, method 1100 may continue to 1160 where the controller continues directing hydrogen gas to the negative side and liquid electrolyte to the positive side of the fuel cell rebalancing reactor.

In the case where the $\Delta P$ across the positive side of the fuel cell is greater than the $\Delta P$ across the porous layer, method 1100 may continue at 1170 where adjust the $\Delta P$. In one example, flow of hydrogen gas and liquid electrolyte may be directed to another fuel cell rebalancing reactor connected in parallel. The method may proceed to compare the $\Delta P$ across the positive and negative sides against the threshold pressure difference (e.g., the bubble pressure of the porous layer).

In some examples, the current fuel cell rebalancing reactor may be shut down and serviced, including one or more of cleaning the positive side flow channels, replacing the porous layer, and replacing the positive electrode at 1170.

Thus, a method of operating a rebalancing reactor for a redox flow battery includes flowing hydrogen through a first side of the rebalancing reactor, flowing electrolyte from the redox flow battery through the second side of the rebalancing reactor without flowing the electrolyte through the first side of the reactor, and fluidly contacting the hydrogen gas and the electrolyte at a surface of a porous layer interposed between the first side and the second side. In a first example of the method flowing hydrogen through the first side includes flowing hydrogen through the first side without flowing hydrogen through the second side. A second example of the method optionally includes the first example, and further includes wherein flowing electrolyte from the redox flow battery includes flowing electrolyte from a positive electrolyte chamber of the redox flow battery. A third example of the method optionally includes one or more of the first and second examples, and further includes wherein flowing electrolyte from the redox flow battery includes flowing electrolyte from a negative electrolyte chamber of the redox flow battery. A fourth example of the method optionally includes one or more of the first through third examples, and further includes wherein fluidly contacting the hydrogen gas and the electrolyte at the surface of the porous layer includes reducing metal ions in the electrolyte with the hydrogen gas at a carbonaceous surface of the porous layer. A fifth example of the method optionally includes one or more of the first through fourth examples, and further includes maintaining a pressure drop across the second side less than the pressure drop across the porous layer. A sixth example of the method optionally includes one or more of the first through fifth examples, and further includes wherein maintaining the pressure drop across the second side less than the pressure drop across the porous layer includes maintaining a pressure drop across the first side less than a bubble pressure of the porous layer. A seventh example of the method optionally includes one or more of the first through sixth examples, and further includes wherein maintaining the pressure drop across the second side less than the pressure drop across the porous layer includes maintaining a pressure drop across the second side less than a bubble pressure of the porous layer. An eighth example of the method optionally includes one or more of the first through seventh examples, and further includes wherein maintaining the pressure drop across the second side less than the pressure drop across the porous layer includes maintaining the pressure drop across the second side less than the pressure drop across the porous layer by more than a threshold pressure difference.

In this way, the fuel cell rebalancing reactors described herein can achieve a technical effect of rebalancing electrolyte charge for a redox flow battery system more efficiently than packed bed rebalancing reactors or other conventional rebalancing reactors. Furthermore, the fuel cell rebalancing reactors, being flow-through reactors with simpler design as compared to packed bed reactors, may be stacked and connected in parallel to increase capacity and flexibility and redundancy of the electrolyte rebalancing. For example, in the case where a fuel cell rebalancing reactor performance decreases (e.g., ΔP across positive side greater than ΔP across porous layer) hydrogen gas and liquid electrolyte can easily be redirected to another fuel cell rebalancing reactor, while the lower-performing rebalancing reactor is serviced or replaced, during charging and discharging of the redox flow battery system and without experiencing down time of the redox flow battery system.

Note that the example control and estimation routines included herein can be used with various battery and/or vehicle system configurations. The control methods and routines disclosed herein may be stored as executable instructions in non-transitory memory and may be carried out by the control system including the controller in combination with the various sensors, actuators, and other battery hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the redox flow battery control system, where the described actions are carried out by executing the instructions in a system including the various battery hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A rebalancing reactor for a redox flow battery system, including:
    a first side extending from a hydrogen inlet to a hydrogen outlet, through which a hydrogen gas is flowed, wherein the first side is a negative side comprising a negative electrode;
    a second side extending from an electrolyte inlet and an electrolyte outlet, through which an electrolyte from the redox flow battery system is flowed, the electrolyte inlet and the electrolyte outlet connectable with a recirculation flow path of the electrolyte between a battery cell of the redox flow battery system and an electrolyte storage tank of the redox flow battery system;
    a porous layer separating and fluidly coupled to the first side and the second side, wherein
        the porous layer comprises a porous medium that is ionically and electrically conductive, the porous layer further comprising a positive electrode integrated therewith,
        the hydrogen gas and the electrolyte are fluidly contacted at a surface of the porous layer, and
        a pressure drop across the second side is less than a pressure drop across the porous layer; and
    an ejector configured to draw hydrogen gas exiting the first side as electrolyte flowing through the second side flows through the ejector.

2. The rebalancing reactor of claim 1, wherein the pressure drop across the second side corresponds to a pressure drop across an inlet and an outlet of the second side.

3. The rebalancing reactor of claim 1, wherein a pressure drop across the first side is greater than the pressure drop across the second side.

4. The rebalancing reactor of claim 1, wherein the first side includes an interdigitated flow field through which the hydrogen gas is flowed, thereby forcing the hydrogen gas entering the first side through the porous layer prior to exiting the first side.

5. The rebalancing reactor of claim 1, wherein the second side includes an interdigitated flow field through which the electrolyte is flowed, thereby forcing the electrolyte entering the second side through the porous layer prior to exiting the second side.

6. The rebalancing reactor of claim 1, further comprising the negative electrode integrated with the porous layer, wherein the negative electrode and the positive electrode are conductively coupled to the porous layer, and wherein an electric current applied across the negative electrode and the positive electrode increases a rebalancing reaction rate between the hydrogen gas and the electrolyte.

7. The rebalancing reactor of claim 1, wherein the porous layer is a same material and a same structure as the negative electrode.

8. A rebalancing reactor for a redox flow battery system, including:
   a first side extending from a hydrogen inlet to a hydrogen outlet, through which a hydrogen gas is flowed, wherein the first side is a negative side comprising a negative electrode;
   a second side extending from an electrolyte inlet and an electrolyte outlet, through which an electrolyte from the redox flow battery system is flowed, the electrolyte inlet and the electrolyte outlet connectable with a recirculation flow path of the electrolyte between a battery cell of the redox flow battery system and an electrolyte storage tank of the redox flow battery system;
   a porous layer separating and fluidly coupled to the first side and the second side, wherein
      the porous layer comprises a porous medium that is ionically and electrically conductive, the porous layer further comprising a positive electrode integrated therewith,
      the hydrogen gas and the electrolyte are fluidly contacted at a surface of the porous layer; and
      a pressure drop across the second side is less than a pressure drop across the porous layer;
   an ejector configured to draw hydrogen gas exiting the first side as electrolyte flowing through the second side flows through the ejector; and
   an interdigitated flow field configured to force the electrolyte or hydrogen through the porous layer.

9. A method of operating a rebalancing reactor for a redox flow battery, including:
   flowing hydrogen through a first side of the rebalancing reactor, the first side extending from a hydrogen inlet to a hydrogen outlet, wherein the first side is a negative side comprising a negative electrode;
   flowing electrolyte from the redox flow battery through a second side of the rebalancing reactor without flowing the electrolyte through the first side of the reactor, the second side extending from an electrolyte inlet to an electrolyte outlet, the electrolyte inlet and the electrolyte outlet connectable with a recirculation flow path of the electrolyte between a battery cell of the redox flow battery and an electrolyte storage tank of the redox flow battery, and wherein an ejector is configured to draw hydrogen gas exiting the first side as the electrolyte flowing through the second side flows through the ejector; and
   fluidly contacting the hydrogen gas and the electrolyte at a surface of a porous layer interposed between the first side and the second side such that the porous layer separates and is fluidly coupled to the first side and the second side, wherein
      the porous layer comprises a porous medium that is ionically and electrically conductive, the porous layer further comprising a positive electrode integrated therewith, and
      a pressure drop across the second side is less than a pressure drop across the porous layer.

10. The method of claim 9, wherein flowing hydrogen through the first side includes flowing hydrogen through the first side without flowing hydrogen through the second side.

11. The method of claim 9, wherein flowing electrolyte from the redox flow battery includes flowing electrolyte from a positive electrolyte chamber of the redox flow battery.

12. The method of claim 9, wherein flowing electrolyte from the redox flow battery includes flowing electrolyte from a negative electrolyte chamber of the redox flow battery.

13. The method of claim 9, wherein fluidly contacting the hydrogen gas and the electrolyte at the surface of the porous layer includes reducing metal ions in the electrolyte with the hydrogen gas at a carbonaceous surface of the porous layer.

14. The method of claim 9, further comprising maintaining a pressure drop across the second side less than the pressure drop across the porous layer.

15. The method of claim 14, wherein maintaining the pressure drop across the second side less than the pressure drop across the porous layer includes maintaining a pressure drop across the first side less than a bubble pressure of the porous layer.

16. The method of claim 14, wherein maintaining the pressure drop across the second side less than the pressure drop across the porous layer includes maintaining a pressure drop across the second side less than a bubble pressure of the porous layer.

17. The method of claim 14, wherein maintaining the pressure drop across the second side less than the pressure drop across the porous layer includes maintaining the pressure drop across the second side less than the pressure drop across the porous layer by more than a threshold pressure difference.

18. A redox flow battery system, including:
   a plurality of redox flow battery cells,
   a first rebalancing reactor fluidly coupled to a second rebalancing reactor, each of the first and second rebalancing reactors including:
      a first side extending from a hydrogen inlet to a hydrogen outlet and comprising a negative electrode, through which hydrogen gas is flowed;
      a second side extending from an electrolyte inlet and an electrolyte outlet and comprising a positive electrode, through which electrolyte from the plurality of redox flow battery cells is flowed, the electrolyte inlet and the electrolyte outlet connectable with a recirculation flow path of the electrolyte between a battery cell of the redox flow battery system and an electrolyte storage tank of the redox flow battery system; and
      a porous layer separating and fluidly coupled to the first side and the second side, wherein,
         the porous layer comprises a porous medium that is ionically and electrically conductive with the negative electrode and the positive electrode integrated with the porous layer,
         the hydrogen gas and the electrolyte are fluidly contacted at a surface of the porous layer, and a pressure drop across the second side is less than a pressure drop across the porous layer by less than threshold pressure difference; and an ejector configured to draw hydrogen gas exiting the first side to mix with electrolyte entering the second side.

19. The redox flow battery system of claim 18, further comprising a controller, with executable instructions stored in memory thereon to, responsive to the pressure drop across the second side of the first rebalancing reactor being less than the pressure drop across the porous layer by less than the threshold pressure difference, redirect a portion of the flow of the electrolyte from the first rebalancing reactor to the second rebalancing reactor.

20. The redox flow battery system of claim 19, wherein the executable instructions include, responsive to the pressure drop across the second side of the first rebalancing reactor being less than the pressure drop across the porous layer by less than the threshold pressure difference, reducing a flow of the electrolyte to the second side of the first rebalancing reactor.

\* \* \* \* \*